United States Patent [19]

Behmel et al.

[11] 4,132,687
[45] Jan. 2, 1979

[54] NONIONICALLY/CATIONICALLY STABILIZED AQUEOUS EMULSIONS AND PROCESS THEREFOR

[75] Inventors: Klaus Behmel; Wolfgang Schmut; Bertram Zückert, all of Graz, Austria

[73] Assignee: Vianova Kunstharz, A.G., Graz, Austria

[21] Appl. No.: 776,431

[22] Filed: Mar. 10, 1977

[30] Foreign Application Priority Data

Mar. 17, 1976 [AT] Austria ................... 1982/76

[51] Int. Cl.$^2$ ............ C09D 3/64; C09D 3/727; C09D 5/02
[52] U.S. Cl. ............ 260/22 A; 260/29.2 R; 260/29.2 EP; 260/29.2 UA; 260/29.2 E; 260/29.6 PM; 260/29.7 EM
[58] Field of Search ....... 260/22 A, 29.2 R, 29.2 EP, 260/29.2 UA, 29.2 E, 29.6 PM, 29.7 EM

[56] References Cited

U.S. PATENT DOCUMENTS

| | | | |
|---|---|---|---|
| 3,223,658 | 12/1965 | Kraft et al. | 260/22 XA |
| 3,310,512 | 3/1967 | Curtice | 260/29.2 E |
| 3,366,591 | 1/1968 | Marshall et al. | 260/75 N |
| 3,438,943 | 4/1969 | Miranoa et al. | 260/75 N |
| 3,440,193 | 4/1969 | Campagna | 260/22 R |
| 3,882,188 | 5/1975 | Behmel | 260/75 N |
| 3,932,358 | 1/1976 | de Cleur et al. | 260/75 N |
| 3,997,674 | 12/1976 | Ukai et al. | 260/29.6 B |

*Primary Examiner*—Ronald W. Griffin
*Attorney, Agent, or Firm*—A. W. Breiner

[57] ABSTRACT

Nonionically/cationically stabilized aqueous emulsions of paint binders for use in stoving coating compositions and a process of producing such emulsions is described. The nonionic and cationic stabilization of the emulsion is accomplished by the inclusion in the binders of from about 1 – 20 percent by weight of nonionic structural units of the formula

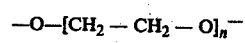

$n$ being an integer of from about 5 – 100, and 0.05 – 3 moles/kg of oxazoline structural units of the formula

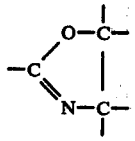

Coating compositions using the emulsion when applied to a surface as a film and thermally cured possess improved properties.

18 Claims, No Drawings

NONIONICALLY/CATIONICALLY STABILIZED AQUEOUS EMULSIONS AND PROCESS THEREFOR

The present invention relates to aqueous emulsions for use in stoving coating compositions and to a process of producing such emulsions. More particularly, the invention relates to aqueous emulsions suitable for use in stoving coating compositions which are nonionically/cationically stabilized, the stabilizing moieties including ethyleneglycol units and oxazoline units.

Water-dilutable coating compositions in recent times have been gaining in importance. However, the spectrum of water-dilutable binder systems is still incomplete, rendering it impossible to simply replace and conventional coating vehicle with a water-dilutable system. Moreover, the existing water-dilutable binder systems have disadvantages for various applications.

For the preparation of coatings designed to have certain decorative qualities such as high gloss, specific surface appearance or color shade, it has been necessary up to now to use water-dilutable products which are almost exclusively made up of macromolecules substantially in molecular dispersed form. Such water-dilutable products, however, are not completely satisfactory for all applications in that they either contain high quantities of toxic organic solvents and neutralizing agents, or include a multiplicity of hydrophilic groups and/or are of low molecular weight which in turn reduces the resistance of the film to water, alkali, and the like.

Accordingly, a desired water-dilutable binder system is one based on aqueous emulsions or dispersions of macromolecules, for example alkyd resins, acrylic copolymers, epoxy resins, or the like having high molecular weight and in which substantially all or all organic solvents are omitted. Efforts have been made to produce such emulsions using known emulsion-forming techniques such as the techniques described by H. Warson, *The Applications Of Synthetic Resin Emulsions*, Ernest Benn Ltd., London (1972). The emulsions have normally been stabilized using two independent systems; the first being nonionic stabilization, and the second being ionic stabilization. The nonionic stabilization has been primarily through the introduction of polyethyleneglycol into the resin making up the binder system, such as alkyd resins as described in U.S. Pat. Nos. 3,223,658, 3,269,967, and 3,440,193, or East German Pat. No. 88,833; or through the introduction of the polyethyleneglycol chains into the binder as disclosed in U.S. Pat. Nos. 2,634,245, 2,853,459, 3,133,032, 3,223,659, 3,379,548, 3,437,615, 3,437,618, 3,442,835, 3,457,206, and 3,639,315; in German patent specification No. 14 95 031, or British patent specification No. 1,038,696 and 1,044,821. In the prior art hydrophobic resins have been emulsified with the aid of water-soluble resins as described in U.S. Pat. No. 3,077,459.

With the systems utilizing the nonionic emulsifiers based on polyethyleneglycol, it has been necessary to include ionic stabilizers since otherwise in order to obtain satisfactory stabilization a high level of polyethyleneglycol is necessary which, in turn, reduces the resistance of the film to a level where the products are not acceptable for many applications. Ionic stabilizers such as the commonly used anionic stabilizers, however, cause difficulties in emulsions used in stoving coating compositions. Even at low film thicknesses the paint films strongly tend to cissing on baking, with the tendency increasing with the addition of curing catalysts. It is theorized that this cissing phenomenon is due to the quick solidification on thermal cross-linking of the film surface such that neither the water retained in the film nor the formed reaction products are released. Additionally, on spray application of such products air is retained in the film requiring longer flash-off periods and/or the co-employment of anti-foaming agents. Furthermore, as a result of the anionic character of the binder the formed film is sensitive to basic mediums, reducing the resistance of the resultant films to alkaline conditions.

According to the present invention it has been found that the disadvantages of aqueous emulsions for use in stoving coating compositions can be overcome by introducing the ionic groups necessary for stabilization into the binder as oxazoline groups neutralized with acids.

The present invention, therefore, is directed to a process for producing nonionically/cationically stabilized emulsions useful in or as stoving paint vehicles which are based on polycondensation products, polymerization products, or polyaddition products, and to the products obtained. The disclosed process is characterized in that paint binders are emulsified in water, which binders contain, calculated on binder solids, of from about 1–20 percent by weight, preferably 2–12 percent by weight, of nonionic structural units of the formula

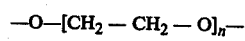

n being an integer of from about 5–100, and 0.05–3 moles/kg, preferably 0.1–1.2 moles/kg, of oxazoline structural units of the formula

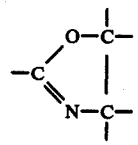

and partially or totally neutralized with inorganic and/or organic acids. The emulsification can optionally occur at elevated temperatures and/or in the presence of minor amounts of organic solvents.

The emulsions of the present invention provide a number of important advantages over anionically stabilized emulsions. Thus, when application is by spraying, trapped air is quickly released. Even when applied as relatively thick films, no cissing is observed even with short flash-off periods. Resistance to basic reactants as well as water is pronouncedly improved. No yellowing occurs on stoving as is normally observed with products containing amine groups.

The binder resins which can be used to prepare the products of the invention are those normally used in the coating art, including polycondensation resins such as modified or unmodified alkyd resins; polymers of ethylenically unsaturated components such as the acrylic copolymers; modified polyether resins, and the like. The resin binders to be employed and production procedures are known to those skilled in the art. The alkyd resins are understood to be polycondensates of polyhydric alcohols with polyvalent carboxylic acids, which optionally can be modified with monoalcohols and/or monocarboxylic acids, polymerizable monomers, isocyanates, etc. The acrylic copolymers noted as being exemplary are polymerization products containing at least in part acrylic or methacrylic units. The modified polyether resins are the esters of saturated and/or unsaturated fatty acids, normally having at least 8 C-atoms, with mono- or polyepoxides of various structures.

The polyethyleneglycol or its monoalkylether used for introduction of nonionic units and thus for nonionic stabilization of the emulsions of the invention have structural units of the formula —O—$CH_2$—$CH_2$—O, and can either be chemically connected with the resin binder to be emulsified or with a portion of it, or such units can be connected to water-insoluble low-molecular radicals which are admixed with the binder resin. The preferred method normally is to chemically combine the polyethyleneglycol since the thus-obtained films exhibit higher resistance to aqueous reactants.

The methods of introducing the polyethyleneglycol into binder resins are known per se and are, for example, mentioned in the patent specifications referred to hereinbefore. For instance, if the binder resin is prepared through polyesterification, the polyethyleneglycol can be added during manufacture and is, thus, connected to the binder resin through ester linkages. The polyglycols can also be connected to the binder resin through special coupling compounds. Examples of such coupling compounds are amine resins, polyfunctional alkoxysilanes, epoxy compounds, isocyanates, and the like. In a typical process the polyethylene structure can be introduced in the form of the re-etherification product of hexamethoxymethylmelamine with a polyethyleneglycol or an alkyl polyethyleneglycol.

For the introduction of the oxazoline structural units necessary for the cationic stabilization, chemical combination or admixture in a form connected to water-insoluble radicals can be used. Admixture of the stabilizer component does not impair the resistance characteristics of the films since the oxazoline ring loses its basic character and, thus, its hydrophilizing effect through hydrolysis or acidolysis forming acid amide structures during the curing reaction. The methods for preparing the oxazoline compounds are known and are, e.g., described in detail in J. A. Frump, *Chemical Reviews*, 71, 483 (1971); and R. H. Wiley and L. L. Bennett, *Chemical Reviews*, 44, 447 (1949).

The introduction of the oxazoline groups into the macromolecule is carried out according to known methods. For example, a monomer carrying oxazoline groups such as vinyl oxazoline can be used in the preparation of the binder resin, or the carboxy groups of a binder resin can be reacted with a suitable 2-amino alcohol such as 2-amino-2-hydroxymethylpropanediol-1,3 or 2-amino-2-ethylpropanediol, as is described, e.g., in U.S. Pat. No. 3,882,188. The oxazoline structure can also be introduced either by reaction or admixture, with an oxazoline obtained through reaction of a fatty acid or an acid polyester with a 2-amino alcohol. Furthermore, the stabilizing structures may be introduced with "emulsifier resins," i.e., polyesters or similar resins containing both structures. Additionally, products at various pre-reaction steps can be used. In all cases to obtain good paint performance it is necessary for the binder to have certain qualifications regarding viscosity and hydroxyl number. The viscosity should be within a certain range which allows emulsification at temperatures of up to a maximum of 100° C., optionally in the presence of organic solvents. The viscosity of the binder is further more governed by the flow characteristics of the paint. Normally, an intrinsic viscosity of about 18 ml/g, measured at 20° C. in dimethyl formamide, is the maximum to give paint surfaces without defects. To obtain a sufficient degree of cross-linking, the binder should have a hydroxy number of at least 60 mg KOH/g.

In order to provide the oxazoline groups in the salt-form, inorganic or organic acids can be used. For sufficient hardening at temperatures of below 150° C., it is normally necessary that at least a portion of the acid is a strong inorganic acid or its organic derivative such as p-toluol sulfonic acid. The acids are either admixed to the binder prior to emulsification and/or dissolved in the water used for emulsifying in the initial phases of emulsification.

The polymers normally are cross-linked with aminoplast resins; but other cross-linking resins such as the phenolic resins or epoxy resins, at least in part, can also be used. The cross-linking material can be added before or after the emulsion is made, and optionally it can be partially reacted with the binder resin prior to emulsification.

The products of the invention can be used in the normal way for the preparation of paints in conjunction with pigments, extenders, and additives. These substances are incorporated with known equipment like triple roll mills, ball mills, sand mills, either before or after emulsification. The latter method is recommended in cases of organic pigments critical with regard to dispersing. In order to enhance processing and film formation, subordinate quantities of solvents, preferably high boiling ones, can be added before or after emulsifying.

In preparing the emulsion no specific equipment is necessary. In principle, the emulsion is made at ambient temperature with the equipment normally used in the paint industry. In case the viscosity of the binder is too high before the addition of water, it can be reduced by warming and/or the addition of solvents.

The paints prepared from the products of the invention can be cured at temperatures of from about 110° C. upwards with the co-employment of acid catalysts.

The following examples illustrate the invention without limiting the scope thereof. Parts are by weight unless otherwise stated.

EXAMPLE 1

190 parts coconut fatty acids, 48 parts polyethyleneglycol (molecular weight 3000), 120 parts pentaerythritol, 90 parts propyleneglycol, and 250 parts phthalic anhydride are esterified at 200°–220° C. to an acid number of 15 mg KOH/g using xylol as an entraining agent. The reaction of the obtained polyester is carried on with 21 parts of 2-amino-2-ethylpropane diol-1,3 at 140°–190° C. to an acid value of below 2 mg KOH/g to provide a product with an oxazoline content of 0.25 moles/kg. The product is diluted to a solids content of 75 percent with a 1:1 blend of ethyleneglycol monoethylether acetate (EGA) and diethyleneglycol monobutylether (BDG). (Product 1A)

13.3 parts of Product 1A are mixed at ambient temperature with 1 part of a 10 percent solution in water of p-toluol sulfonic acid while stirring, and diluted to 40 percent with deionized water. A transparent aqueous emulsion is obtained. (Product 1B)

A pigmented emulsion paint is prepared by admixing 100 parts of $TiO_2$ (Rutile grade) with 33.4 parts of Product 1A and 10 parts of a commercially available water-dilutable melamine resin (partially etherified with methanol, 63 percent solids, viscosity at 20° C.: 4.0-5.0 P) and dispersing the admixture on a triple roll mill. Upon addition of a further 60 parts of Product 1A and 20 parts melamine resin solution, an emulsion is prepared by adding 10 parts of the 10 percent solution in water of p-toluol sulfonic acid and 80 parts of deionized water and dispersing. After addition of 0.8 parts of a silicone paint additive the paint is spray applied to primed panels and cured for 30 minutes at 130° C. after short flash-off. A paint with the following characteristics is obtained:

| film thickness (finish) | 40 μm |
|---|---|
| pendulum hardness (DIN 53157) | 130 s |
| indentation (DIN 53156) | 5 mm |
| Gardner impact (paint/reverse) | 70/30 inch-pounds |
| gloss Lange | >100% |

Despite short flash-off, no cissing of the paint film occurred.

EXAMPLE 2

190 parts coconut fatty acids, 48 parts polyethyleneglycol (average molecular weight about 3000), 120 parts pentaerythritol, 100 parts propyleneglycol, and 250 parts phthalic anhydride are esterified as described in Example 1, until an acid value of 5 mg KOH/g is obtained. (Product 2A)

In another vessel 280 parts technical linoleic acids and 124 parts 2-amino-2-hydroxymethylpropanediol-1,3 are reacted at 140°-190° C. to an acid value of below 2 mg KOH/g, a water-insoluble low-molecular oxazoline compound being obtained. (Product 2B)

Blending 99 parts of the polyester (Product 2A) with 1 part of the low-molecular oxazoline compound (Product 2B) at about 100° C. and dilution with EGA/BDG (1:1) to 75 percent solids, provides a binder which, like the binder described in Example 1, is processed to an aqueous emulsion paint. The paint performance is similar to that of Example 1. At a film thickness of 40 μm, the paint films show no cissing.

EXAMPLE 3

Esterification of 1142 parts of the symmetrical bis-(2-hydroxy-propyl)-ether of 4,4-diphenylolpropane with 620 parts adipic acid to an acid value of 55 mg KOH/g and reaction with 205 parts 2-amino-2-hydroxymethylpropanediol according to U.S. Pat. No. 3,882,188 produces a linear oxazoline polyester (Product 3A)

In another vessel 1500 parts methylpolyethyleneglycol (molecular weight 500) and 390 parts hexamethoxymethylmelamine are reacted at 140°-160° C. with the aid of 2 parts p-toluol sulfonic acid until no methanol is set free anymore. (Product 3B)

2200 parts of the oxazoline polyester 3A are mixed with 1890 parts of Product 3B and reacted under vacuum at 120°-160° C. until an intrinsic viscosity of 11.5 ml/g at 20° C. in dimethylformamide is reached. (Product 3C)

In the preparation of an aqueous emulsion, 640 parts Product 3A are dissolved in 100 parts of a high boiling solvent naphtha and 100 parts BDG. Upon addition of 770 parts of a 70 percent solution in butanol of a butanol etherified benzoguanamine resin, 200 parts of solvent (substantially butanol) are vacuum-stripped at 110° C. After addition of 450 parts of Product 3C (80 percent in BDG), 170 parts of a 10 percent aqueous solution of p-toluol sulfonic acid and 1850 parts deionized water are stirred in. An aqueous emulsion is obtained having a solids content of 40 percent which cures at from 120° C. upwards. (Emulsion A)

For preparing a pigmented paint, a pigment paste is made by mixing

| | | |
|---|---|---|
| benzoguanamine resin, 70% in butanol | 8.6 | parts |
| Product 3C, 80% in BDG | 13 | parts |
| ethyleneglycol monoethylether | 5 | parts |
| benzylalcohol | 5 | parts |
| titaniumdioxide (Rutile) | 52 | parts |
| red iron oxide | 3.1 | parts |
| yellow iron oxide | 1.8 | parts |
| ® Hostapermblau A 3 R (Hoechst AG) | 2.6 | parts |
| ® Hostapermgrün (Hoechst AG) | 0.1 | parts |

213 parts of Emulsion A are added, then 0.3 parts of a silicone paint additive and 0.5 parts of a 20 percent ethanol solution of p-toluol sulfonic acid are added. An aqueous emulsion paint is obtained. The viscosity is adjusted with water and the paint is sprayed to steel panels, allowed a flash-off for 5 minutes and cured at 130° C. for 30 minutes. Glossy coats are obtained showing no cissing even at a film thickness of 50-60 μm.

EXAMPLE 4

780 parts hexamethoxymethylmelamine are reacted under vacuum at 110° C. with 1500 parts polyethyleneglycol (molecular weight 1500) together with 2.5 parts p-toluolsulfonic acid, until 60 parts methanol have distilled off. (Product 4B)

In preparing an emulsifier resin 2220 parts of Product 4B and 5300 parts of the molten oxazoline polyester of Example 3 (Product 3A) are reacted at 140° C. under vacuum, until an intrinsic viscosity of 11.5 ml/g (measured in dimethylformamide at 20° C.) is obtained. The obtained product is diluted to 80 percent solids with ethyleneglycol monoethylether. (Product 4C)

For preparation of an emulsion paint, a pigment paste is prepared by mixing

| titaniumdioxide (Rutile) | 80.0 |
|---|---|
| Product 4C, 80% | 14.0 |
| benzoguanamine resin, 70% in butanol | 8.7 |
| ethyleneglycol monoethylether | 8.0 |

An emulsion paint ready to spray is prepared by adding with stirring the following components:

| Product 3A, 80% | 40.6 | |
|---|---|---|
| benzoguanamine resin, 70% | 46.5 | as a blend |
| Product 4C, 80% | 22.2 | |
| p-toluol sulfonic acid, 20%, ethanol | 5.0 | |
| silicone paint additive | 0.5 | |
| deionized water | 100.0 | |

The paint is sprayed onto steel panels and is cured after short flash-off (about 5 minutes) at 130° C. for 30 minutes or at 150° C. for 15 minutes. The obtained paint films are non-cissing at a film thickness of 40-50 μm and have the following characteristics:

| pendulum hardness (DIN 53157) | 180 s |
|---|---|
| indentation (DIN 53156) | 7.5 mm |
| Gardner impact (paint/reverse) | <80/ <80 inch-pounds |
| crosshatch (DIN 53151) | Gt O |
| water resistance (water soak at 40° C.) | no affect after 300 hours |
| alkali resistance (10% NaOH at 23° C.) | no affect after 300 hours |

EXAMPLE 5

168 parts phthalic anhydride, 1 part maleic anhydride, and 154 parts dipropylene glycol are esterified to an acid value of 47 mg KOH/g and reacted with 30 parts 2-amino-2-hydroxymethylpropanediol-1,3 to give an oxazoline polyester with an oxazoline content of 0.75 moles/kg. (Product 5A)

6260 parts of the oxazoline polyester of Product 5A are reacted according to the method described in Example 4 with 2200 parts Product 4B, to form an emulsifier resin with an intrinsic viscosity of 11.3 ml/g (measured in dimethylformamide at 20° C.). The product is diluted to 80 percent solids with ethyleneglycol monoethylether. (Product 5C)

100 parts of the 80 percent solution of the oxazoline polyester in ethyleneglycol monoethylether (Product 5A) are mixed with 72 parts of the solution of the emulsifier resin (Product 5C) and emulsified in 200 parts water with the addition of 20 parts of a 10 percent aqueous solution of p-toluol sulfonic acid.

This emulsion is mixed with 54 parts of hexamethoxymethylmelamine and 2 parts of a silicone paint additive and applied to a glass plate with a doctor blade. The film is cured at 130° C. for 30 minutes. A gloss film with a pendulum hardness (DIN 53157) of 130 s is obtained.

As will be apparent to one skilled in the art, various modifications can be made in the claimed aqueous emulsions including modification in and of the resin binder, as well as variation in the proportions of various components. Such modifications being within the ability of one skilled in the art to be covered herein, with the invention only being limited in accordance with the appended claims.

It is claimed:

1. A nonionically/cationically stabilized aqueous emulsion of stoving paint binders, said binders including at least one film-forming polymeric resin suitable for use in a protective coating composition; and said paint binders including as nonionic and cationic moieties, calculated on binder solids, of from about 1–20 percent by weight of nonionic structural units of the formula

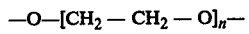

n being an integer of from about 5–100, and of from about 0.05–3 moles/kg of oxazoline structural units of the formula

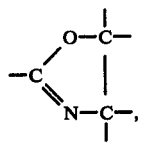

and being partially or totally neutralized with acids.

2. The aqueous emulsion of claim 1 wherein the nonionic structural units are present at from about 2–12 percent by weight calculated on binder solids.

3. The aqueous emulsion of claim 2 wherein the oxazoline structural units are present in an amount of from about 0.1–1.2 moles/kg.

4. The aqueous emulsion of claim 1 neutralized with an inorganic acid.

5. The aqueous emulsion of claim 1 neutralized with an organic acid.

6. The aqueous emulsion of claim 1 wherein the nonionic and oxazoline units are chemically integrated into the resin of the binder.

7. The aqueous emulsion of claim 1 wherein the nonionic and oxazoline units are chemically bonded to a portion of the resin of the binder.

8. The aqueous emulsion of claim 1 wherein the nonionic and oxazoline units are a part of another component and admixed with the resin of the binder.

9. The aqueous emulsion of claim 1 wherein the nonionic structural units are introduced from a polyethyleneglycol or its monoalkylether.

10. The aqueous emulsion of claim 1 wherein said binder has a maximum intrinsic viscosity of 18 ml/g measured in dimethylformamide at 20° C.

11. The aqueous emulsion of claim 1 wherein the binders have a minimum hydroxyl number of 60 mg KOH/g.

12. A process of preparing a nonionically/cationically stabilized aqueous emulsion comprising introducing into a film-forming polymeric resin suitable for use in a protective coating composition from about 1–20 percent by weight of nonionic structural units of the formula $$-O-[CH_2-CH_2-O]_n-$$

n being an integer of from about 5–100, and of from about 0.05–3 moles/kg of oxazoline structural units of the formula

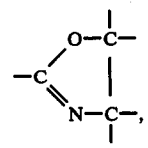

partially or totally neutralizing with acids and emulsifying in water.

13. Process of claim 12 wherein emulsification occurs at an elevated temperature.

14. Process of claim 12 wherein emulsification occurs in the presence of minor quantities of an organic solvent.

15. Process of claim 12 wherein the oxazoline structural units are neutralized with a strong inorganic acid.

16. Process of claim 12 wherein the oxazoline structural units are neutralized with a strong organic acid.

17. The aqueous emulsion of claim 1 wherein said polymeric resin is a polycondensation resin.

18. The process of claim 12 wherein the polymeric resin is a polycondensation resin.

* * * * *